United States Patent [19]

Wilson et al.

[11] 4,105,749

[45] Aug. 8, 1978

[54] PHOSPHORIC ACID MANUFACTURE FROM PHOSPHATE MATRIX

[75] Inventors: Robert A. Wilson, Winter Haven; David J. Raden, Fort Meade, both of Fla.

[73] Assignee: Swift Agricultural Chemicals Corporation, Chicago, Ill.

[21] Appl. No.: 794,311

[22] Filed: May 5, 1977

Related U.S. Application Data

[63] Continuation of Ser. No. 668,715, Mar. 22, 1976, abandoned.

[51] Int. Cl.² ............................................. C01B 25/16
[52] U.S. Cl. ..................................... 423/320; 423/305; 423/308; 423/319
[58] Field of Search ............ 423/167, 319, 320, 321 S, 423/305, 308

[56] References Cited

U.S. PATENT DOCUMENTS 1,929,441  10/1933  Milligan ........................... 423/321 S
1,929,443  10/1933  Milligan ........................... 423/321 S

FOREIGN PATENT DOCUMENTS 1,089,682  11/1967  United Kingdom ..................... 423/307

Primary Examiner—O. R. Vertiz
Assistant Examiner—Eugene T. Wheelock
Attorney, Agent, or Firm—Jay C. Langston; Edward T. McCabe; Charles E. Bouton

[57] ABSTRACT

Phosphate ora matrix is treated to recover $P_2O_5$ values. The matrix may be the phosphate ore as it is mined, or it may be residue formed upon dewatering benefication slimes. Without being subjected to beneficiation, this matrix is slurried with an organic solvent in a slurry vessel. When the slurry is mixed with a strong mineral acid, a system having a single liquid phase is formed with the organic solvent serving as a vehicle for distribution of the mineral acid which in turn solubilizes $P_2O_5$ values for their extraction from the matrix. Thereafter the $P_2O_5$ values are separated from the solid phase and then removed from the organic solvent.

10 Claims, 2 Drawing Figures

PHOSPHORIC ACID MANUFACTURE FROM PHOSPHATE MATRIX

This is a continuation, of application Ser. No. 668,715, filed Mar. 22, 1976 now abandoned.

This invention relates to the direct extraction of $P_2O_5$ values from phosphate ore matrix and includes a method and means for extracting without having to beneficiate the matrix.

In the traditional production of so-called phosphoric acid, it is not thought to be feasible to directly treat the low-grade phosphate ore matrix as it is mined. Before actual production is initiated, it is traditionally necessary to beneficiate the ore matrix, or apatite, into what is commonly known as phosphate rock. The phosphate ore matrix generally consists of roughly equal parts of phosphatic oolites, clays, and sand, and has an average $P_2O_5$ value analysis of between about 8 to 12% of the matrix. Beneficiation not only significantly increases the $P_2O_5$ value of the ore, but it also dramatically changes its physical properties, from those of a moist, clay-like ore matrix into those of sand-like granular phosphate concentrate or pebble phosphate. The phosphate beneficiated by these traditional techniques is in a form suitable for further traditional processing to thereby increase its $P_2O_5$ values, if desired.

The traditionally required beneficiation procedure includes washing and flotation steps and produces, in addition to the phosphate rock, significant quantities of sand tailings and of waste pond slimes. The slimes in particular present several problems. These beneficiation slimes are potentially of value since they do contain $P_2O_5$ values, usually in the form of finely ground ore which cannot be recovered in the beneficiation procedure but passes into the beneficiation wash water which comprises a large portion of the slimes. These slimes have a very high water content, usually on the order of 93 to 95 weight percent. Even after they are passed to storage in open waste ponds and allowed to settle for 20 years or more, the slimes still contain about 75 to 80 weight percent water. Because of these high water contents, the slimes, even after settling for in excess of 20 years, are still substantially useless. They are not readily further processed for recovery of their residual $P_2O_5$ values. Also they still are unsuitable for use as land fill since they are structurally unable to support loads. Along these same lines, the slimes still pose several potential environmental risks, should the slimes escape from their storage ponds, usually secured by earthen dams.

It has previously been recognized that organic solvents, especially alcohols, may be useful in improving the further processing of the phosphate rock formed by traditional beneficiation techniques. Disclosures of this development are found in Nickerson, et al., U.S. Pat. No. 3,408,161; Becker, U.S. Pat. No. 3,548,843; "Fertilizer Abstracts 4 (No. 6)", June 1971, pages 133–136, Item 933; and "A New Route to High Quality Phosphate Fertilizers", Mabin, presented before the American Chemical Society Division of Fertilizer and Soil Chemistry, Washington, D.C., Sept. 15, 1971. Prior to the present invention, no workable process or means had been developed whereby organic solvents are put to use in recovering $P_2O_5$ values directly from the phosphate ore matrix, thereby obviating the need to beneficiate the matrix into phosphate rock. By following these general principles, the present invention precludes the need to form the undesirable slimes, eliminates costly beneficiation time and capital expenditures, permits the utilisation of especially low-grade phosphate ore deposits, generally produces a phosphate product that has fewer impurities than traditional phosphate products, and lowers dust pollution problems brought about by traditional grinding requirements.

It is accordingly an object of the present invention to provide a method and a means whereby $P_2O_5$ values are recovered directly from clay-like phosphate ore matrix, either as mined or as recovered from dewatering slimes, without the need to first beneficiate the phosphate in the matrix.

A further object of this invention is to provide a method and a means whereby $P_2O_5$ values are recovered from the phosphate ore matrix without forming undesirable slimes.

Still another object of the invention is an improved method and means for producing so-called phosphoric acid.

An additional object of this invention is an improved phosphoric acid production method and means capable of recovering $P_2O_5$ values of improved purity from very low-grade ore deposits, including those that are high in iron and aluminum content.

One other object of the invention is an improved method and means which minimizes grinding needs in the production of so-called phosphoric acid and accordingly minimizes dust pollution problems.

Another object of this invention is to recover more of the $P_2O_5$ values removed from the mine pit than are recovered by traditional beneficiation methods, since $P_2O_5$ values which are lost in the discarded tailings and slimes of traditional methods are included in the material that is subjected to extraction in this invention.

Yet another object of the present invention is an improved method and means for in situ formation of phosphate salts, especially those including nitrogen and/or potassium values.

One further object of this invention is to provide an improved phosphoric acid extraction method and means which utilize a single liquid phase extraction system.

Another object of the invention is to provide an improved method and means for producing phosphoric acid, while substantially all of the by-products formed are useful as marketable products or constitute suitable load-bearing land fill.

By the method and means of this invention, $P_2O_5$ values are recovered directly from phosphate ore matrix. The matrix is slurried with a suitable organic solvent, and the $P_2O_5$ values of the matrix are then extracted in a reaction vessel with a strong mineral acid, preferably sulfuric acid, into the liquid phase of the slurry. After the liquid phase is separated from the solid phase within a decanting means, it is passed to a means for removing the solvent from the $P_2O_5$ values which are collected.

Additional objects, if not set forth specifically herein, will be readily apparent to those skilled in the art from the detailed description of the invention which follows and from the drawings in which.

Figure 1:
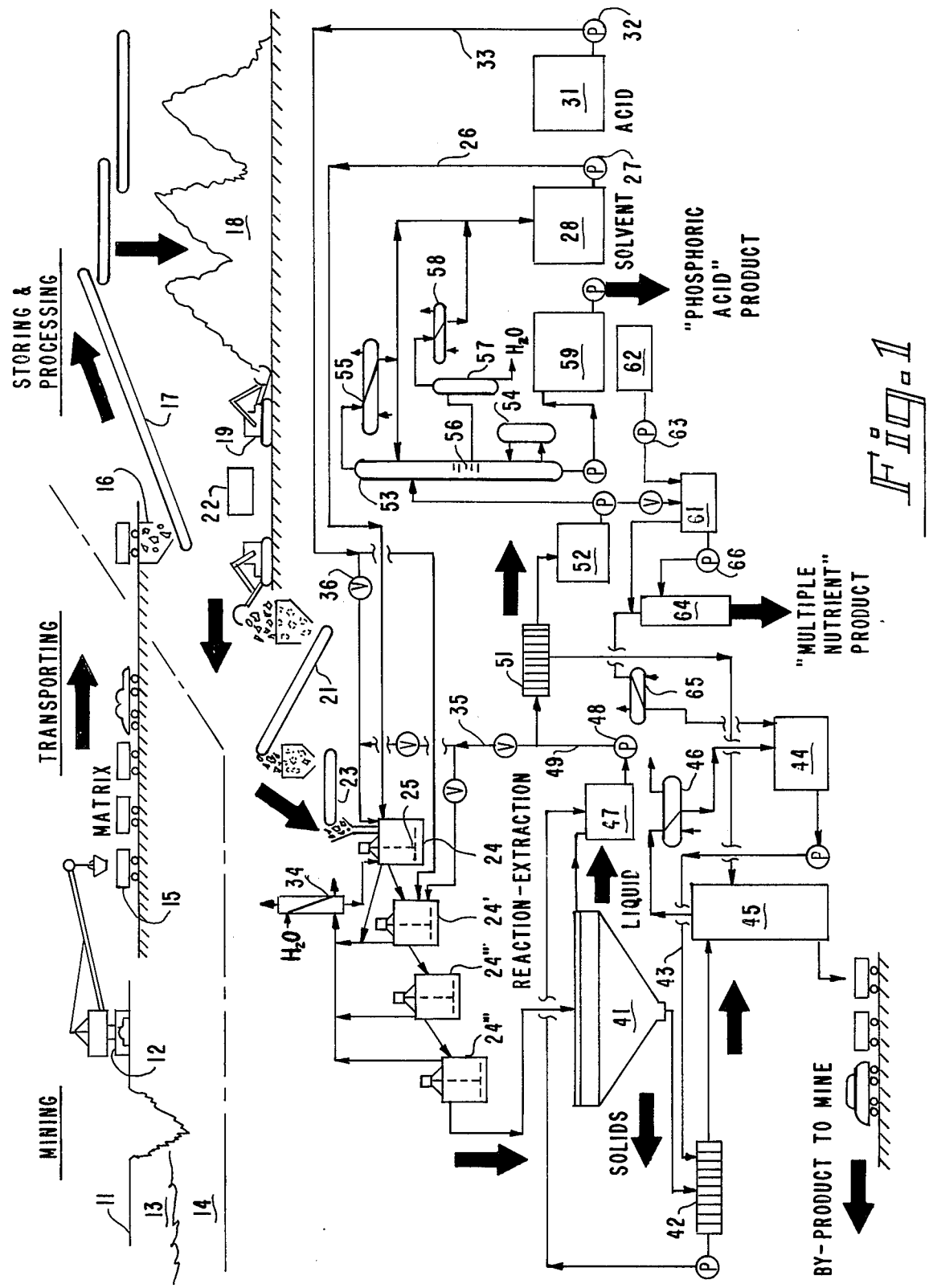
FIG. 1 is a schematic illustration of the apparatus of this invention and includes optional and alternate structure.

Generally, the method of this invention is for producing so-called phosphoric acid directly from phosphate matrix found in mines or dewatered slimes without having to first beneficiate the matrix into what is known in the industry as phosphate rock. In the phosphate trade, the term phosphoric acid is used loosely to refer to $P_2O_5$. More accurate $P_2O_5$ chemical names include phosphoric oxide, phosphorous pentoxide, and phosphoric anhydride. In an effort to lessen confusion in the present disclosure, these terms on the whole, will be, replaced by the terminology "$P_2O_5$ values". Matrix as used herein includes both ore as it is mined and residue from dewatered slimes. Phosphate rock refers to phosphate ore matrix deposits that have been subjected to ore dressing, or beneficiation, methods. While a typical mined matrix would have $P_2O_5$ values on the order of 8 to 12 weight percent, typical phosphate rock would have $P_2O_5$ values ranging from 28 to 34 weight percent. A matrix has the physical appearance and properties of a moist clay, having a natural moisture content on the order of 16 weight percent, while a beneficiated phosphate rock is sand-like or pebble-like.

The present method recognizes the value of an organic solvent in forming a slurry with the matrix and the ability of the solvent to form a single liquid phase with a strong mineral acid, preferably sulfuric acid whereby the solvent acts as a vehicle to carry the mineral acid to the slurried matrix for reaction with the matrix to release $P_2O_5$ values therefrom as phosphoric acid which is miscible with the solvent. A more detailed disclosure of the essential and the optional steps of this method follows.

The matrix, generally supplied by a strip mining operation, is transported from the mining pit to a central location for processing the matrix by slurrying with an organic solvent. Sulfuric acid is added to the slurry, preferably along with $P_2O_5$ values recycled from downstream, to extract and digest $P_2O_5$ values from the slurried matrix into the single liquid phase of the slurry. The overall chemical reaction may be stated in simple, unbalanced form as:

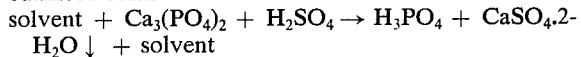

The finely divided gypsum solids, represented as $CaSO_4.2H_2O$ above, are then separated from the liquid phase, including the $H_3PO_4$ represented above, by centrifugation, filtration, decantation, or the like. Next, the organic solvent is removed from the $P_2O_5$ values, which are collected as so-called phosphoric acid for use or shipment as is or for further concentration, if desired. Preferably, the removal of the solvent from the $P_2O_5$ values is accomplished by distillation.

The preferred organic solvent utilized in forming the slurry is methanol. It is preferred because of its low cost and ease of removal by distillation from the $P_2O_5$ values. Other solvents include any primary alcohol, secondary alcohol, or ketone that is miscible with phosphoric acid and that can be readily separated therefrom, preferably by distillation. Specific examples include ethyl alcohol, normal propanol, isopropyl alcohol, 1-butanol, 2-butanol, acetone, 2-butanone, and 2-butanol-2-methyl.

Depending upon the physical properties, especially the screen size of the matrix, it may be especially advantageous to the reaction rate and efficiency of the process if the slurring step is accomplished after or simultaneously with a rough crushing or grinding operation. Generally adequate in this regard is a rough crushing operation to particle sizes on the order of ¼ to ½ inch diameter. Especially efficient results obtain if a grinding to particle sizes of from about 100 to 200 mesh is carried out in a ball mill or the like.

Optionally, depending upon the moisture content of the matrix, it may prove advantageous and efficient to remove moisture from the matrix itself rather than from the product. This result can come about by the grinding or crushing of the matrix prior to slurrying which generates drying heat. Moisture removal may also be accomplished by standard drying methods and devices, including flame fueled devices such as a rotary dryer. Alternatively, this reduction in the moisture content of the matrix may be accomplished by first slurrying the untreated, crushed or dried matrix with the solvent without the addition of any acid to allow some of the undesired moisture to be extracted into the solvent. The moisture-containing solvent is then physically separated from the matrix, after which the moisture may be distilled from the solvent. The solvent may then be recycled.

The quantity of strong mineral acid needed to effectively carry out the extracting step will vary with its concentration. For example, the $H_2SO_4$ concentration can be on the order of 93%. Calculating the sulfuric acid quantities on the basis of 100% $H_2SO_4$, the weight ratio of sulfuric acid to $P_2O_5$ as phosphate in the matrix will generally range between 2 to 1 and 3 to 1. The CaO content of the matrix varies and thus more or less sulfuric acid may be required. Also, the excess sulfuric acid in the reaction step can be varied to effect optimum crystal formation. Accordingly, the weight ratio may be varied to accomplish these results, as desired. This ratio, when put in terms of the phosphate ore matrix will, of course, also vary with the $P_2O_5$ and moisture contents of the mined matrix. Typical weight ratios of 100% $H_2SO_4$ to matrix vary approximately between 1 to 4 and 2 to 5.

Keeping the acid concentration strong during the reacting step has the advantage of minimizing the quantity of undesired impurities in the final product. Undesirable impurities in the matrix might otherwise be solubilized and hence extracted into the single liquid phase during the reacting step. For example, iron and aluminum are commonly found in the matrix, especially in low-grade matrix that cannot be effectively processed in conventional methods. These impurities are solubilized more readily by a weak acidic medium than by a strong one. Provided they are not solubilized during the extracting step, then they will not be included in the final product. This points up another advantage of the present process over traditional water-acid systems, which utilize sulfuric acid in relatively weak concentrations and which inherently will mean that iron and aluminum will be included in the traditional product. After concentration, the traditional final product ("phosphoric acid") will, upon standing in storage with the concentrated $P_2O_5$ values, form a supersaturated salt that will precipitate out and impair the acceptability of the product.

The quantity of organic solvent needed initially likewise will vary with the actual solvent used and with the makeup of the matrix. A typical weight ratio of a solvent such as methanol to $P_2O_5$ as phosphate in the matrix is between about 5 to 1 and 25 to 1. Stated terms of the weight of the phosphate ore matrix itself, the ratio of solvent to matrix is between approximately 0.6 to 1 and 2 to 1.

Of course, for economic reasons, it is desirable to utilize as little solvent and strong mineral acid as possible and still efficiently perform the method. As a general approach, it is preferred that the total solids content in the extracting step should be no greater than about 40 to 50 weight percent of the total material within the reacting chamber. This is to insure that the slurry will not be too thick for efficient handling and reacting.

The reaction of sulfuric acid and phosphoric acid with $P_2O_5$ values is exothermic. When methanol is used as the extracting agent to take up the phosphoric acid produced in a soluble form, the reaction temperature will range from about 148° to 154° F (64.4° to 67.8° C). It is preferred that the reaction temperature be controlled by taking advantage of the latent heat of vaporization of the solvent through refluxing the solvent during the reacting step. More particularly, the solvent is vaporized by boiling at the reaction temperature and is passed out of the reaction zone to a refluxing zone where it is condensed and returned to the reacting zone. This procedure provides a simple and convenient means for holding a relatively constant reaction temperature that approximates the boiling point of the solvent.

The reaction temperature can be varied within practical limits by varying the water content of the solvent fed during the reacting step. For example, a mixture of 80 weight percent methanol and 20 weight percent water boils at about 154° F (67.8° C), while 100 percent methanol boils at 148° F (64.4° C). Other suitable solvents have higher boiling points; suitable water mixtures thereof will bring about a variety of reaction temperatures as high as the maximum acceptable temperature of about 185° F (85° C).

The separating step, which follows the reacting step, accomplishes a physical separation of the solid phase from the liquid phase containing the $P_2O_5$ values. It is preferred that the solid phase be dryed, primarily for the purpose of vaporizing residual or organic solvent which may then be collected for reuse. Also vaporized will be water that is miscible with the solvent in all proportions and which was introduced into the system primarily from the natural water content of the matrix itself. Since one basic feature of the present invention is that the main extraction is carried out in a substantially non-aqueous system, it is desirable to remove this water content from the organic solvent before it is actually reused in the slurry. This is most easily accomplished by distillation, preferably in a distillation system that is common to the solvent recirculation and distillation system of the slurrying step itself.

The separated solid phase, a crude gypsum formed during the reacting step and containing impurities from the matrix, is generally suitable for land fill operations. Preferably, the solid phase is returned to the strip mining location as part of an overall land reclamation operation. Also the crude gypsum itself may be a useful by-product, for example as an agricultural "liming agent."

The separated liquid phase, containing the $P_2O_5$ values, is subjected to distillation whereby the organic solvent and excess water are vaporized, condensed and collected for reuse in the slurry forming step. The separated liquid $P_2O_5$ values are collected as the final so-called phosphoric acid product or as an intermediate product for further concentration of the $P_2O_5$ values so as to form products particularly useful as fertilizers of high $P_2O_5$ values.

As an alternative to the collection of so-called phosphoric acid by this distillation step, there can be accomplished instead a separation by salting out the $P_2O_5$ values with a base. This alternative means of separation can be valuable in forming, in situ, a salt that is essentially useful as a fertilizer having a fertilizing nutrient content in addition to the $P_2O_5$ content. The major fertilizer nutrients, in addition to $P_2O_5$ values, are nitrogen N and potassium oxide K2O. This alternative step is accomplished by adding a quantity of base containing nitrogen or potassium values to the liquid phase that had been separated from a gypsum-containing solid phase. For example, ammonia can be added to the liquid phase to precipitate out $NH_4H_2PO_4$ or $(NH_4)_2HPO_4$ and thus form in situ a compound useful as a fertilizer having both N and $P_2O_5$ values. As another example, potassium hydroxide can be added to the liquid phase to salt out in situ $KH_2PO_4$ useful as a fertilizer having both $P_2O_5$ and $K_2O$ values.

FIG. 1 shows the overall apparatus required in mixing, transporting, storing and processing the matrix. While the present invention relates primarily to the processing apparatus, the mixing, transporting, and storing means are also described.

The matrix is removed from the earth 11 by a mining means, such as dragline 12. The dragline 12 strips off overburden 13, which is generally stored in piles for later land reclamation. The matrix 14 is communicated by dragline 12 into a transport means 15, which may be a railroad car as depicted, a hopper feeding a conveyor belt, or the like.

Transport means 15 leads to a hopper 16 in the processing area. Generally, since the dragline 12 is at a distant location from the apparatus in the processing area, the transport means 15 must be capable of transporting matrix for long distances. It is convenient, but not essential, for hopper 16 to open into a conveyor system 17 to facilitate the formation of matrix storage piles 18.

A means 19, such as the front-end loader depicted, may be provided for supplying the raw matrix 14 into the processing apparatus. Supply means 19 preferably communicates directly with a matrix feed means 21. Alternatively, supply means 19 may first communicate with a crusher 22, or the like. It is preferred that feed means 21 open into a means for uniformally regulating the matrix feed rate such as a feed rate weighing machine 23. In any event, matrix 14 is fed into vessel 24, which preferably includes an agitation member 25. Vessel 24 may be an unobstructed vessel, a mixer, a grinder, a crusher, or an agitated vessel. Vessel 24 communicates with conduit 26 which includes a pump 27 associated with a solvent supply tank 28. Also provided is an acid supply tank 31 having a pump 32 and a line 33 which may be in communication with vessel 24 for supplying a strong mineral acid, preferably sulfuric acid. It is preferred that a reflux condenser 34 be in communication with vessel 24 for collecting organic solvent, condensing it, and returning it to vessel 24.

An alternate embodiment of apparatus calls for a plurality of vessels 24 or for a vessel having a plurality of compartments. Either arrangement permits a gradual variation of reactant ratios, temperatures, and physical properties of the reactants to promote optimum efficiency of the overall extraction reaction as it proceeds from initial to nearly complete reaction conditions. An acceptable number of compartments or vessels is four, represented as vessels 24, 24', 24" and 24'". As an example of how the conditions can be advantageously varied, the first tank 24 may include a "phosphoric acid" feed 35, while gate valve 36 cuts off acid supply line 33. A reaction begins between the phosphoric acid and the matrix in the matrix-solvent slurry. This releases heat to initiate boiling of the solvent and its subsequent passage through reflux condenser 34. The slurry then enters tank 24' for contact with acid from line 33. The acid continues the reaction with the matrix in the slurry whereupon the gypsum-containing solid is formed and $P_2O_5$ values are released into the organic solvent. The communication of tank 24' with reflux condenser 34 serves to control the reaction temperature by the same mechanism utilized in tank 24. This reaction is repeated and carried further in additional vessels 24" and 24''', if provided.

Reaction vessel 24 communicates with a decanting means 41 for separating a liquid phase from a solid phase. The solid phase, really a thick slurry having a high solids content, preferably then passes to a separation means 42 which may be a filter press, a centrifuge apparatus, or a similar device for more complete removal of liquid, which may be assisted by washing of the solid with fresh solvent supplied through pipe 43 associated with an auxiliary solvent tank 44 which may be the same or in communication with solvent supply tank 28. In the preferred apparatus, separation means 42 is in communication with a dryer 45 wherein residual organic solvent and absorbed moisture are driven off yielding the dried solids which are conveyed to railroad cars or other transport or storage means for eventual return to the mined-out pits or to market. In order to recover and reuse the organic solvent, the solvent and moisture driven off in dryer 45 can be collected in a condenser 46. The condensate is collected in auxiliary solvent tank 44.

The liquid containing $P_2O_5$ values removed in decanting means 41 and in separation means 42 are preferably collected together in a hold tank 47. By means of a pump 48, the liquid is passed into conduit 49. Conduit 49 may be in communication with a polishing filter 51 upstream of a holding vessel 52. Downstream of holding vessel 52 is a distillation column 53 wherein solvent in the liquid phase is vaporized by reboiler 54 and removed from the $P_2O_5$ values of the liquid phase. A condenser 55 collects and condenses the vaporized solvent for return to solvent supply tank 28. Column 53 may include a water-rich tray 56 which is in communication with a redistillation means 57 and 58 to salvage further solvent values. The bottom of column 53 is in communication with product storage tank 59.

The strength of the $P_2O_5$ values of the product is controlled by the amount of water present throughout the apparatus and also by the final bottom temperatures in distillation column 53.

As an optional feature of the present apparatus, the hold tank 52 may be in communication with a crystalization chamber 61 provided for the purpose of preparing, in situ, products having primary fertilizer nutrients in addition to $P_2O_5$ values. A container 62 for supplying an appropriate base, such as anhydrous ammonia or potassium hydroxide, communicates via pump 63 with chamber 61. The solvent slurry of crystals formed in chamber 61 passes to a means 64 such as a dryer for recovery of solvent which may be collected in auxiliary solvent tank 44, preferably after passage through condenser 65. The dried solids are collected as a product having multiple primary nutrient values.

The following Examples are set forth as illustrative embodiments of this invention and are not to be taken in any manner as limiting the scope of the invention which is defined by the appended claims.

EXAMPLE I

Figure 2:
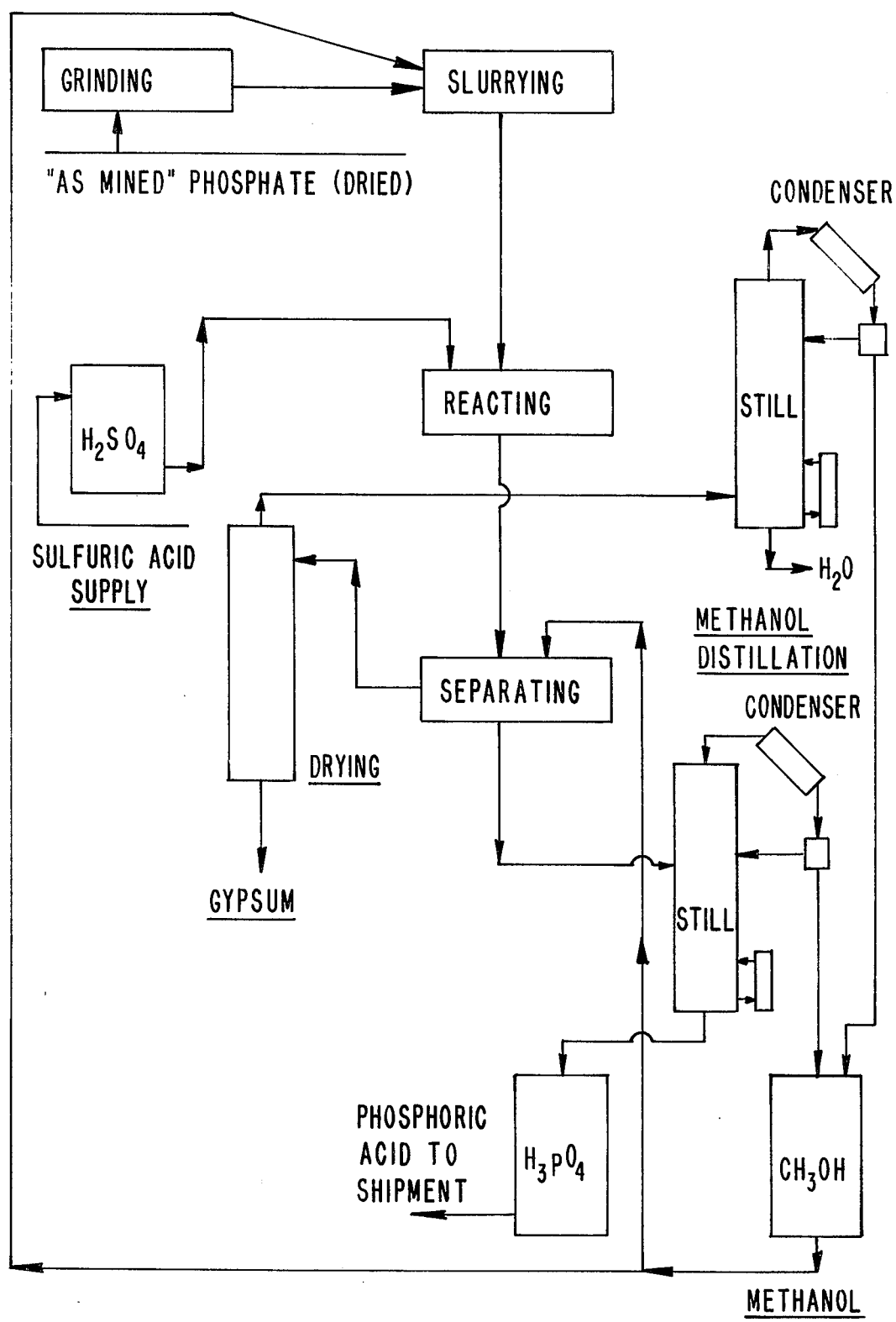
FIG. 2 is a flow diagram of the preferred method described in Example I.

A specific example of the method of this invention as illustrated in the flow chart of FIG. 2. A quantity of phosphate matrix was dried at 120° C for 24 hours. The dried matrix was ground to pass 85% through 100 mesh. One Thousand grams were slurried with 2000 cc of technical grade methanol and placed in a reactor vessel having an agitator. The reaction was initiated when 93% $H_2SO_4$ was added, the reaction temperature being about 154° F, at which temperature boiling occurred. A total of 166 cc of $H_2SO_4$ was added over a period of about 30 minutes. With the reactor being under a slight vacuum, the reaction was allowed to continue for an additional 30 minutes after the $H_2SO_4$ addition was stopped. The reactants were then filtered through a No. 3 Whatman filter paper and washed with methanol. The separated solids were recovered and dried. The filtrate of methanol and $H_3PO_4$ was placed in a still and the methanol was distilled from the acid and condensed for recycling. The distillation was conducted at about 170° F and under 25 inches Hg vaccum. The reaction itself was smooth and no foaming was observed. The yield of $H_3PO_4$ was 276.0 grams, for a $P_2O_5$ value recovery percentage of 69.6% of the $P_2O_5$ fed to the process.

EXAMPLE II

Example I was substantially duplicated, except this time 38 cc of water was added to the dried, ground matrix to bring it more into line with the undried matrix as mined. One hundred seventy-four cc of $H_2SO_4$ were added over a period of 35 minutes, the total reaction time being 215 minutes. The yield of $H_3PO_4$ was 212.1 grams, and its specific gravity was 1.312.

EXAMPLE III

The procedure of Example II was followed, except that 76 cc of water were added. The yield of $H_3PO_4$ was 227.8 grams, at a specific gravity of 1.317. This was a $P_2O_5$ recovery of 62.1%.

EXAMPLE IV

The procedure of Example III was substantially repeated, except that the total reaction time was only 50 minutes. The yield was 190.2 grams of $H_3PO_4$ at a specific gravity of 1.504 at 20° C. The percentage recovery was 62.1% $P_2O_5$. When analyzed, the $H_3PO_4$ product included 27% of the $Fe_2O_3$ present in the feed.

EXAMPLE V

The process of Example IV was substantially repeated, except that here the 174 cc of $H_2SO_4$ were added over a period of only 15 minutes, with the total reaction time being 45 minutes. The yield was 224.2 grams of $H_3PO_4$ at a specific gravity of 1.574 at 20° C. This was a recovery of 65.4% $P_2O_5$. The analyzed $H_3PO_4$ product contained 25% of the $Fe_2O_3$ present in the feed.

EXAMPLE VI

Example V was substantially repeated, except here the 174 grams of $H_2SO_4$ were added over a period of 30 minutes, the total reaction time being 90 minutes. The yield was 169 grams of $H_3PO_4$, specific gravity 1.486 at 20° C. This represented a recovery of $P_2O_5$ of 63.2%.

EXAMPLE VII

The method described in Example I was accomplished, with the starting material being 1179 grams of undried matrix that had not been ground, that is, matrix exactly as it was removed from the earth. Again 2000 cc of methanol were added to form a slurry, to which were added 200 cc of $H_2SO_4$ over a period of 60 minutes. The total reaction time was 240 minutes. The yield of $H_3PO_4$ was 406.6 grams, specific gravity 1.448 at 31° C. This represented a recovery of 60.2% $P_2O_5$.

Obviously, many modification and variations of the invention as hereinbefore set forth may be made without departing from the spirit and scope thereof, and only such limitations should be imposed as are indicated in the appended claims.

We claim:

1. A method for recovering $P_2O_5$ values directly from phosphate matrix, comprising mixing unbeneficiated phosphate matrix with a methanol solvent in an amount such that the weight ratio of methanol solvent to matrix is within the range of about 0.6 to 1 to about 2 to 1, so as to form a slurry of said matrix and a single liquid phase comprising said methanol solvent, adding sulfuric acid to said slurry, said sulfuric acid reacting with the matrix in the slurry to extract $P_2O_5$ values from the matrix and into the liquid phase of the slurry, said liquid phase being primarily $P_2O_5$ values and methanol, and separating the liquid phase from the solid phase of the slurry.

2. The method of claim 1 wherein the weight ratio of sulfuric acid to matrix is within the range of about 1 to 4 and about 2 to 5.

3. The method of claim 1 wherein said unbeneficiated phosphate matrix is selected from the group consisting of phosphate ore, as mined, and residue from dewatered phosphate ore slimes.

4. The method of claim 1 wherein the unbeneficiated phosphate matrix is phosphate ore, as mined, having an average $P_2O_5$ value analysis of between about 8% to about 12% of the matrix.

5. The method of claim 1 wherein the phosphate values are recovered by distilling off the methanol from the liquid phase.

6. The method of claim 1, wherein the extracting step is exothermic and the temperature is controlled within a range of from about 148° to about 185° F. by refluxing the methanol solvent.

7. The method of claim 1, further comprising drying the matrix prior to the slurrying step so as to reduce the natural moisture content of the matrix.

8. The method of claim 1, further comprising crystallizing the $P_2O_5$ values from said separated liquid phase by adding a base to the liquid phase to form a phosphate salt in situ comprising said $P_2O_5$ values.

9. The method of claim 1 wherein said extracting step is carried out in a plurality of stages.

10. The method of claim 9 wherein only said matrix, said methanol solvent and a supply of phosphoric acid are added in a first stage, and wherein said step of adding sulfuric acid is carried out in a second stage.